(12) United States Patent
Park et al.

(10) Patent No.: US 11,977,417 B2
(45) Date of Patent: May 7, 2024

(54) COVER WINDOW AND DISPLAY APPARATUS

(71) Applicant: SAMSUNG DISPLAY CO., LTD., Yongin-si (KR)

(72) Inventors: Youngmin Park, Yongin-si (KR); Sangwon Lee, Yongin-si (KR); Kangwoo Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 46 days.

(21) Appl. No.: 17/833,017

(22) Filed: Jun. 6, 2022

(65) Prior Publication Data

US 2023/0029926 A1 Feb. 2, 2023

(30) Foreign Application Priority Data

Jul. 27, 2021 (KR) .................. 10-2021-0098531

(51) Int. Cl.
  *G06F 1/16* (2006.01)
(52) U.S. Cl.
  CPC .................. *G06F 1/1656* (2013.01)
(58) Field of Classification Search
  CPC ...... G06F 1/1601; G06F 1/1626; G06F 1/163; G06F 1/1633; G06F 1/1647; G06F 1/165; G09G 5/14
  See application file for complete search history.

(56) References Cited

U.S. PATENT DOCUMENTS

| 9,746,884 | B2 * | 8/2017 | Lee ................. G06F 1/1652 |
| 10,939,547 | B2 * | 3/2021 | Lee ................. H05K 1/0313 |
| 11,493,958 | B1 * | 11/2022 | Kakuda ............. G06F 1/1637 |
| 2015/0138041 | A1 * | 5/2015 | Hirakata ............ G06F 3/0412 |
| | | | 345/1.3 |
| 2017/0349473 | A1 | 12/2017 | Moriya et al. |
| 2018/0279494 | A1 * | 9/2018 | Chang .................. B29C 63/30 |

FOREIGN PATENT DOCUMENTS

| CN | 108831303 A | 11/2018 |
| JP | 6579191 B2 | 9/2019 |
| KR | 101221441 B1 | 1/2013 |
| KR | 1020190102123 A | 9/2019 |

* cited by examiner

*Primary Examiner* — Anthony Q Edwards
(74) *Attorney, Agent, or Firm* — CANTOR COLBURN LLP

(57) ABSTRACT

A display apparatus includes: a display panel including a main display area; a first auxiliary display area connected to a first edge of the main display area; a second auxiliary display area connected to a second edge of the main display area, the second edge crossing the first edge; and a corner display area connecting the first auxiliary display area to the second auxiliary display area; and a cover window disposed on the display panel, where a plurality of grooves which is concave in a thickness direction of the cover window is defined in the cover window to correspond to the corner display area.

20 Claims, 11 Drawing Sheets

COVER WINDOW AND DISPLAY APPARATUS

This application claims priority to Korean Patent Application No. 10-2021-0098531, filed on Jul. 27, 2021, and all the benefits accruing therefrom under 35 U.S.C. § 119, the content of which in its entirety is herein incorporated by reference.

BACKGROUND

1. Field

One or more embodiments relate to a cover window and a display apparatus including the cover window.

2. Description of the Related Art

Mobility-based or portable electronic devices have been widely used. Recently, tablet personal computers ("PC"s), in addition to small electronic devices such as mobile phones, have been widely used as mobile electronic devices.

Such a mobile electronic device may include a display apparatus to provide a user with various functions, for example, visual information such as images or videos. As other parts for driving a display apparatus are miniaturized, the proportion of the display apparatus in a mobile electronic device is gradually increasing, and a structure having two or more display areas extending at a certain angle from each other has been developed.

SUMMARY

One or more embodiments include a cover window for diminishing a phenomenon of visually recognizing a boundary of materials having different reflectivity from each other, and a display apparatus including the cover window.

According to one or more embodiments, a display apparatus includes a display panel including a main display area, a first auxiliary display area connected to a first edge of the main display area, a second auxiliary display area connected to a second edge of the main display area, and a corner display area connecting the first auxiliary display area to the second auxiliary display area, where the second edge crosses the first edge, and a cover window disposed on the display panel, where a plurality of grooves, which is concave in a thickness direction of the cover window, is defined in the cover window to correspond to the corner display area.

According to an embodiment, the display panel may include a plurality of strip portions apart from each other in the corner display area and extending from a corner of the main display area, and the plurality of grooves may respectively correspond to a plurality of penetration portions defined between the plurality of strip portions.

According to an embodiment, each of the plurality of grooves may include a first part having a first depth and a second part having a second depth which is less than the first depth, the first part may be apart by a first distance from the corner of the main display area, and the second part may be apart by a second distance from the corner of the main display area, where the second distance may be less than the first distance.

According to an embodiment, the first part of each of the plurality of grooves may have a first width, and the second part of each of the plurality of grooves may have a second width which is less than the first width.

According to an embodiment, a ratio of the first depth to the first width may be equal to a ratio of the second depth to the second width.

According to an embodiment, each of the plurality of grooves may include a first part apart by a first distance from the corner of the main display area, and a second part apart by a second distance from the corner of the main display area, where the second distance may be less than the first distance, and a first cross-sectional area of the first part may be greater than a second cross-sectional area of the second part.

According to an embodiment, the plurality of grooves may extend from a corner of the main display area, and the width of each of the plurality of grooves may gradually increase as the width is farther away from the corner of the main display area.

According to an embodiment, the plurality of grooves may extend from a corner of the main display area, and the depth of each of the plurality of grooves may gradually increases as the depth is farther away from the corner of the main display area.

According to an embodiment, a ratio of the depth to the width of each of the plurality of grooves may be in a range of about 2 to about 10.

According to an embodiment, the cover window may include a first surface facing the display panel, a plurality of first inner side surfaces, and a plurality of second inner side surfaces, where the plurality of first inner side surfaces and the plurality of second inner side surfaces may be connected to the first surface, one end of each of the plurality of second inner side surfaces may be connected to the first surface, the other end of each of the plurality of second inner side surfaces may be connected to the plurality of first inner side surfaces, and each of the plurality of grooves may be defined by the plurality of first inner side surfaces and the plurality of second inner side surfaces.

According to an embodiment, a first angle between each of the plurality of first inner side surfaces and the first surface may be equal to a second angle between each of the plurality of second inner side surfaces and the first surface.

According to an embodiment, a first angle between each of the plurality of first inner side surfaces and the first surface and a second angle between each of the plurality of second inner side surfaces and the first surface may each be greater than about 90° and less than or equal to about 120°.

According to an embodiment, the plurality of first inner side surfaces and the plurality of second inner side surfaces may totally reflect light incident on the cover window.

According to an embodiment, the display apparatus may further include an optical functional layer, at least part of which is disposed in the plurality of grooves.

According to an embodiment, the refractive index of the cover window may be greater than the refractive index of the optical functional layer.

According to one or more embodiments, a cover window includes a main portion, a first auxiliary portion connected to a first edge of the main portion and having a first radius of curvature, a second auxiliary portion connected to a second edge of the main portion and having a second radius of curvature, where the second edge crosses the first edge and a corner portion connecting the first auxiliary portion to the second auxiliary portion, where a plurality of grooves, which is concave in a thickness direction of the corner portion, is defined in the corner portion.

According to an embodiment, the plurality of grooves may extend from a corner of the main portion, and the width of each of the plurality of grooves may gradually increase as the width is farther away from the corner of the main portion.

According to an embodiment, the plurality of grooves may extend from a corner of the main portion, and the depth of each of the plurality of grooves may gradually increase as the depth is farther away from the corner of the main portion.

According to an embodiment, a ratio of the depth and the width of each of the plurality of grooves may be in a range of about 2 to about 10.

According to an embodiment, the plurality of grooves may extend from a corner of the main portion, and the cross-sectional area of each of the plurality of grooves may gradually increase as the cross-sectional area is farther away from the corner of the main portion.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
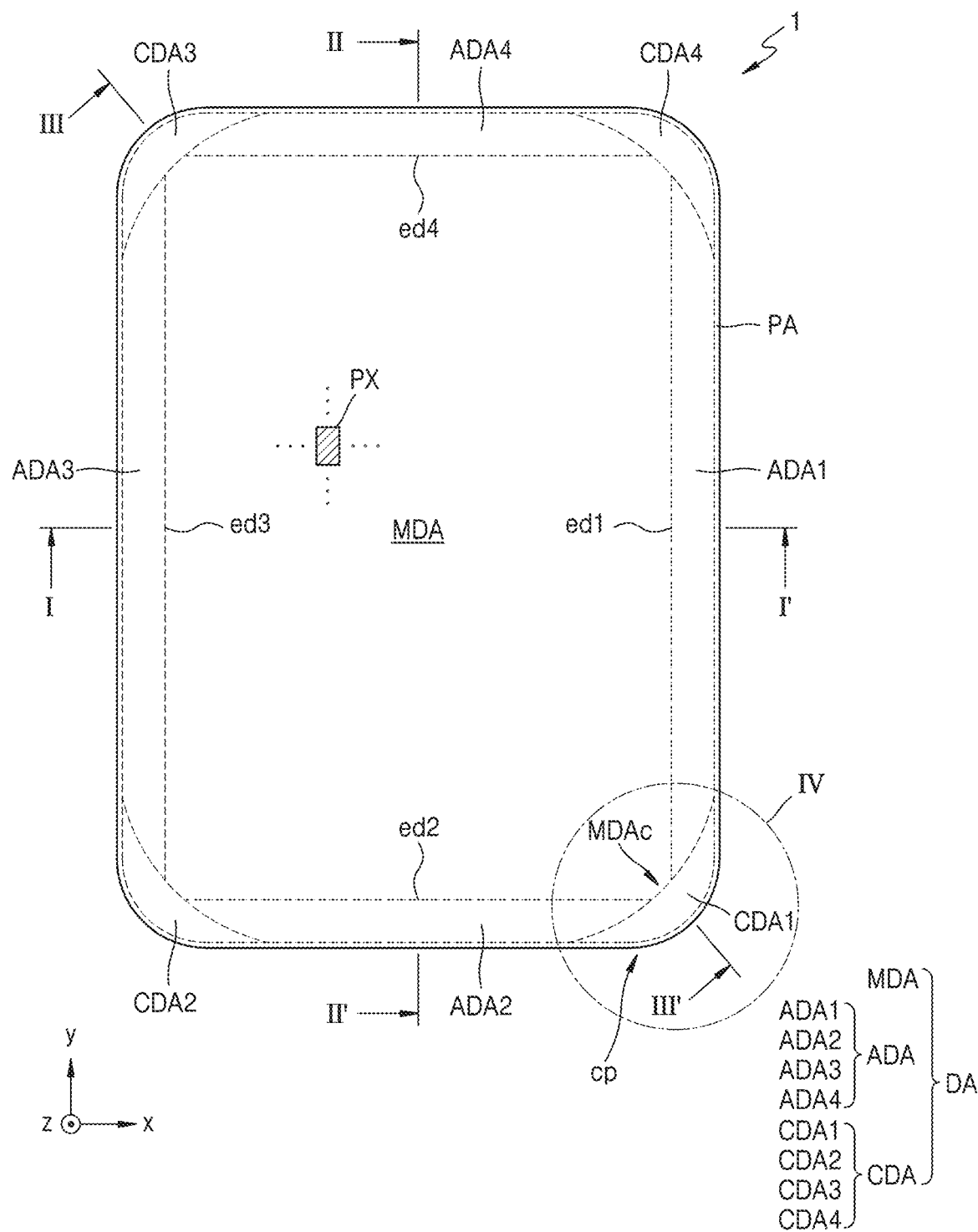
FIG. 1 is a schematic plan view of a display apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Various modifications may be applied to the embodiments described herein, and particular embodiments will be illustrated in the drawings and described in the detailed description section. The effect and features of the embodiments, and a method to achieve the same, will be clearer referring to the detailed descriptions below with the drawings. However, the embodiments may be implemented in various forms, not by being limited to the embodiments presented below.

Hereinafter, exemplary embodiments will be described in detail with reference to the accompanying drawings, and in the description with reference to the drawings, the same or corresponding constituents are indicated by the same reference numerals and redundant descriptions thereof are omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items. "Or" means "and/or." In the specification, the expression such as "A and/or B" may include A, B, or A and B. The expression such as "at least one of A and B" may include A, B, or A and B.

In the embodiments below, it will be understood that when a layer, region, or component is referred to as being "connected to" another layer, region, or component, it can be directly connected to the other layer, region, or component or indirectly connected to the other layer, region, or component via intervening layers, regions, or components. For example, in the specification, when a layer, region, or component is referred to as being electrically connected to another layer, region, or component, it can be directly electrically connected to the other layer, region, or component or indirectly electrically connected to the other layer, region, or component via intervening layers, regions, or components.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Figure 2:
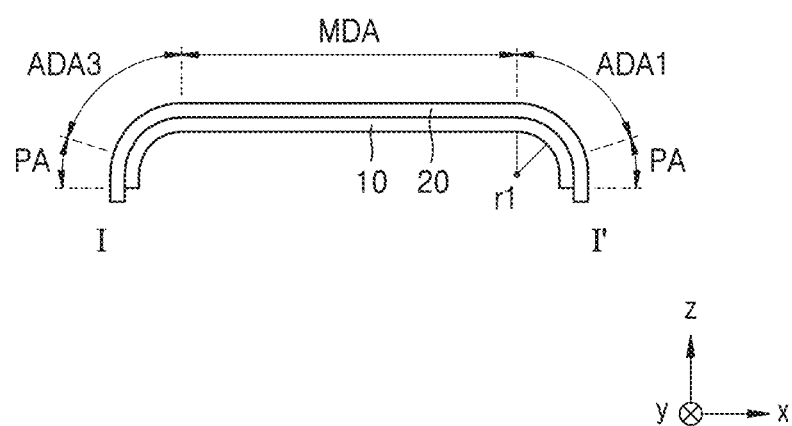
FIG. 2 is a cross-sectional view of the display apparatus of FIG. 1 taken along line I-I'.
Figure 3:
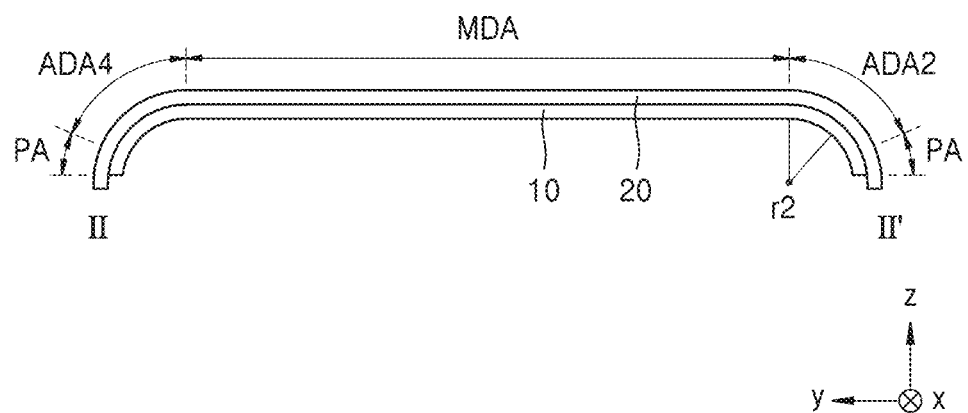
FIG. 3 is a cross-sectional view of the display apparatus of FIG. 1 taken along line II-II'.
Figure 4:
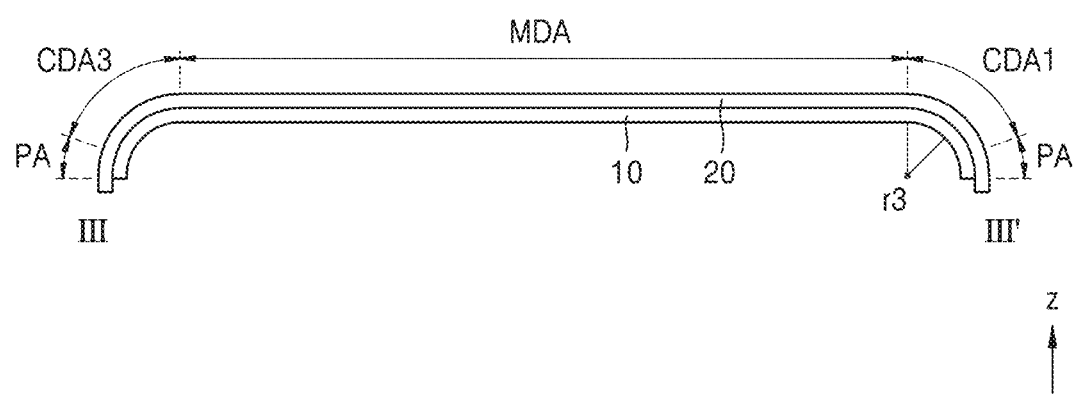
FIG. 4 is a cross-sectional view of the display apparatus of FIG. 1 taken along line III-III'.

FIG. 1 is a schematic plan view of a display apparatus 1 according to an embodiment. FIG. 2 is a cross-sectional view of the display apparatus 1 of FIG. 1 taken along line I-I', FIG. 3 is a cross-sectional view of the display apparatus 1 of FIG. 1 taken along line and FIG. 4 is a cross-sectional view of the display apparatus 1 of FIG. 1 taken along line III-III'.

Referring to FIG. 1, an embodiment of the display apparatus 1, which is an apparatus for displaying a video or a still image, may be used not only as portable electronic devices such as mobile phones, smart phones, tablet personal computers (tablet "PC"s), mobile communication terminals, personal digital assistants ("PDA"s), e-books, portable multimedia players ("PMP"s), navigation devices, ultra-mobile PCs ("UMPC"s), and the like, but also as display screens of various products such as televisions, notebook computers, monitors, billboards, Internet of things ("IOT") device, and the like.

In an embodiment, the display apparatus 1 may be used for wearable devices such as smart watches, watch phones, glasses-type displays, and head mounted displays ("HMD"s). In an embodiment, the display apparatus 1 may be used as a center information display ("CID") placed on the instrument panel of a vehicle and the center fascia or dashboard of a vehicle, a rear-view mirror display in replacement of a side-view mirror of a vehicle, or a display arranged at the back of a front seat as entertainment for the back seat of a vehicle.

The display apparatus 1 may have a long side in a first direction and a short side in a second direction. The first direction and the second direction may cross each other. In an embodiment, for example, the first direction and the second direction may form an acute angle. In an alternative embodiment, for example, the first direction and the second direction may form an obtuse angle or a right angle. Hereinafter, for convenience of description, embodiments in which the first direction, for example, the ±y directions, and the second direction, for example, the ±x directions, form a right angle will be described in detail.

In an embodiment of the display apparatus 1, the length of a side in the first direction, for example, the ±y directions, and the length of a side in the second direction, for example, the ±x directions, may be the same as (or equal to) each other. In an alternative embodiment, for example, the display apparatus 1 may have a short side in the first direction, for example, the ±y directions, and a long side in the second direction, for example, the ±x directions.

A corner where the long side in the first direction, for example, the ±y directions, and the short side in the second direction, for example, the ±x directions, meet may be formed to be rounded to have a certain curvature.

Referring to FIGS. 2 to 4, an embodiment of the display apparatus 1 may include a display panel 10 and a cover window 20. The cover window 20 may function to protect the display panel 10. Although not illustrated in FIGS. 2 to 4, a panel protection member may be arranged or disposed below the display panel 10. The panel protection member may function to protect a lower surface of the display panel 10.

The cover window 20 may be a flexible window. The cover window 20 may protect the display panel 10 while easily bending by an external force without generation of cracks and the like. The cover window 20 may include glass, sapphire, or plastic. In an embodiment, for example, the cover window 20 may include ultra-thin glass)(UTG® or transparent polyimide (or colorless polyimide ("CPI")). In an embodiment, the cover window 20 may have a structure in which a polymer layer having flexibility is arranged on one surface of a glass substrate, or only the polymer layer is arranged.

The display panel 10 may be arranged below the cover window 20. Although not illustrated in FIGS. 2 to 4, the display panel 10 may be bonded to the cover window 20 by using at least one selected from optically clear resin ("OCR"), an optically clear adhesive ("OCA"), and a pressure sensitive adhesive ("PSA").

In an embodiment, the display panel 10 may include a display element having brightness that varies based on a current, for example, an organic light-emitting display panel including an organic light-emitting diode. Alternatively, the display panel 10 may include an inorganic light-emitting display panel, an inorganic electroluminescent ("EL") display panel, or a quantum dot light-emitting display panel. In such an embodiment, a light-emitting layer of the display element in the display panel 10 may include an organic material, an inorganic material, a quantum dot, an organic material and a quantum dot, an inorganic material and a quantum dot, or an organic material, an inorganic material, and a quantum dot.

The display panel 10 may include a display area DA for displaying an image and a peripheral area PA surrounding the display area DA. The display area DA may include a plurality of pixels PX, and an image may be displayed through the pixels PX. Each of the pixels PX may include subpixels. In an embodiment, for example, each of the pixels PX may include a red subpixel, a green subpixel, and a blue subpixel. Alternatively, each of the pixels PX may include a red subpixel, a green subpixel, a blue subpixel, and a white subpixel.

The display area DA may include a main display area MDA, an auxiliary display area ADA, and a corner display area CDA. Each of the main display area MDA, the auxiliary display area ADA, and the corner display area CDA may include the pixels PX, and the pixels PX may display an image.

In an embodiment, the pixels PX arranged in each of the main display area MDA, the auxiliary display area ADA, and the corner display area CDA may provide an independent image or images independently of each other. In an alternative embodiment, for example, the pixels PX arranged in each of the main display area MDA, the auxiliary display area ADA, and the corner display area CDA may respectively provide parts of one image or collectively provide a single unitary image.

The main display area MDA, which is a flat display area, may include the pixels PX including display elements. The main display area MDA may provide a major part of an image.

The pixels PX including display elements may be arranged in the auxiliary display area ADA. The auxiliary display area ADA may display an image by the pixels PX therein. The auxiliary display area ADA may include a first auxiliary display area ADA1, a second auxiliary display area ADA2, a third auxiliary display area ADA3, and a fourth auxiliary display area ADA4. Alternatively, at least one selected from the first auxiliary display area ADA1, the second auxiliary display area ADA2, the third auxiliary display area ADA3, and the fourth auxiliary display area ADA4 may be omitted.

The first auxiliary display area ADA1 and the third auxiliary display area ADA3 may be connected to the main display area MDA in the second direction, for example, the ±x directions. In an embodiment, for example, the first auxiliary display area ADA1 may be connected to the main display area MDA in the +x direction from the main display area MDA, and the third auxiliary display area ADA3 may be connected to the main display area MDA in the −x direction from the main display area MDA. The first auxiliary display area ADA1 may be connected to a first edge ed1 of the main display area MDA, and the third auxiliary display area ADA3 may be connected to a third edge ed3 of the main display area MDA.

Each of the first auxiliary display area ADA1 and the third auxiliary display area ADA3 may be bent at a certain radius of curvature. In an embodiment, the radii of curvature of the first auxiliary display area ADA1 and the third auxiliary display area ADA3 may be different from each other. In an alternative embodiment, for example, the radii of curvature of the first auxiliary display area ADA1 and the third auxiliary display area ADA3 may be the same as each other. Hereinafter, for convenience of description, embodiments in which the radii of curvature of the first auxiliary display area ADA1 and the third auxiliary display area ADA3 are the same as a first radius of curvature r1 will be mainly described in detail. In such embodiments, as the first auxiliary display area ADA1 and the third auxiliary display area ADA3 are the same as or similar to each other, the first auxiliary display area ADA1 will be mainly described in detail.

The second auxiliary display area ADA2 and the fourth auxiliary display area ADA4 may be connected to the main display area MDA in the first direction, for example, the ±y directions. In an embodiment, for example, the second auxiliary display area ADA2 may be connected to the main display area MDA in the −y direction from the main display area MDA, and the fourth auxiliary display area ADA4 may be connected to the main display area MDA in the +y direction from the main display area MDA. The second auxiliary display area ADA2 may be connected to a second edge ed2 of the main display area MDA, and the fourth auxiliary display area ADA4 may be connected to a fourth edge ed4 of the main display area MDA.

The second auxiliary display area ADA2 and the fourth auxiliary display area ADA4 may be bent at certain radii of curvature. In an embodiment, the radii of curvature of the second auxiliary display area ADA2 and the fourth auxiliary display area ADA4 may be different from each other. In an alternative embodiment, for example, the radii of curvature of the second auxiliary display area ADA2 and the fourth auxiliary display area ADA4 may be the same as each other. Hereinafter, for convenience of description, embodiments in which the radii of curvature of the second auxiliary display area ADA2 and the fourth auxiliary display area ADA4 are the same as a second radius of curvature r2 will be mainly described in detail. In such embodiments, as the second auxiliary display area ADA2 and the fourth auxiliary display area ADA4 is the same as or similar to each other, the second auxiliary display area ADA2 will be mainly described in detail.

In an embodiment, the first radius of curvature r1 of the first auxiliary display area ADA1 may be different from the second radius of curvature r2 of the second auxiliary display area ADA2. In an embodiment, for example, the first radius of curvature r1 may be less than the second radius of curvature r2. In an alternative embodiment, for example, the first radius of curvature r1 may be greater than the second radius of curvature r2.

In another alternative embodiment, the first radius of curvature r1 of the first auxiliary display area ADA1 may be the same as the second radius of curvature r2 of the second auxiliary display area ADA2. Hereinafter, for convenience of description, embodiments in which the first radius of curvature r1 is less than the second radius of curvature r2 will be mainly described in detail.

The corner display area CDA may extend from a corner MDAc of the main display area MDA to be bent. The corner display area CDA may be arranged to correspond to a corner portion cp. The corner portion cp, which is a corner of the display area DA, may be a portion where a long side of the display area DA in the first direction, for example, the ±y directions, meets a short side of the display area DA in the second direction, for example, the ±x directions.

The corner display area CDA may be arranged between the auxiliary display areas ADA that neighbor each other. In an embodiment, for example, a first corner display area CDA1 may be arranged between the first auxiliary display area ADA1 and the second auxiliary display area ADA2. In such an embodiment, a second corner display area CDA2 may be arranged between the second auxiliary display area ADA2 and the third auxiliary display area ADA3. In such an embodiment, a third corner display area CDA3 may be arranged between the third auxiliary display area ADA3 and the fourth auxiliary display area ADA4. In such an embodiment, a fourth corner display area CDA4 may be arranged between the fourth auxiliary display area ADA4 and the first auxiliary display area ADA1.

The corner display area CDA may connect the auxiliary display area ADA that neighbor each other. In an embodiment, for example, the first corner display area CDA1 may connect the first auxiliary display area ADA1 to the second auxiliary display area ADA2. In such an embodiment, the second corner display area CDA2 may connect the second auxiliary display area ADA2 to the third auxiliary display area ADA3. In such an embodiment, the third corner display area CDA3 may connect the third auxiliary display area ADA3 to the fourth auxiliary display area ADA4. In such an embodiment, the fourth corner display area CDA4 may connect the fourth auxiliary display area ADA4 to the first auxiliary display area ADA1.

In an embodiment, as described above, the auxiliary display area ADA and the corner display area CDA may be arranged to surround the main display area MDA and may each be bent at a certain radius of curvature.

A third radius of curvature r3 of the corner display area CDA may include a plurality of radii of curvature. The corner display area CDA may have a plurality of third radii of curvature r3. In such an embodiment, the third radius of curvature r3 of the corner display area CDA may vary. In an embodiment, for example, the third radii of curvature r3 of the corner display area CDA may correspond to certain radii of curvature within a vector sum (r1+r2) of the first radius of curvature r1 of the first auxiliary display area ADA1 and the second radius of curvature r2 of the second auxiliary display area ADA2. In such an embodiment, the third radius of curvature r3 may vary within the vector sum (r1+r2) of the first radius of curvature r1 and the second radius of curvature r2.

In an embodiment, the display apparatus 1 may display an image not only in the main display area MDA, but also in the auxiliary display area ADA and the corner display area CDA. Accordingly, the proportion of the display area DA in the display apparatus 1 may increase. In such an embodiment, as the display apparatus 1 bends at corners and includes the corner display area CDA for displaying an image, aesthetics may be improved.

In such an embodiment, since the shape of the display panel 10 may correspond to the shape of the cover window 20, the above descriptions of the display panel 10 which is bent at the first radius of curvature r1, the second radius of curvature r2, and the third radius of curvature r3, may be applied to the cover window 20.

Figure 5:
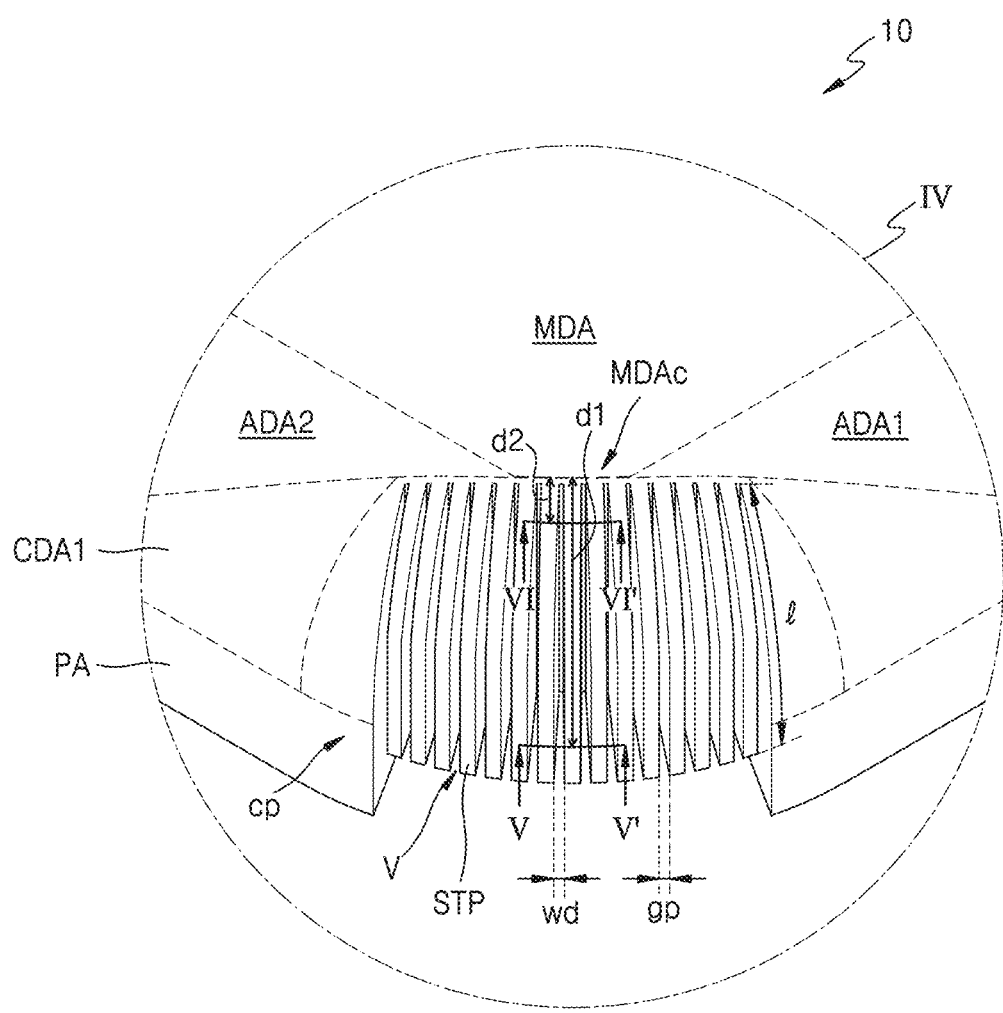
FIG. 5 is a schematic enlarged view of a part IV of a display panel of FIG. 1 according an embodiment.

FIG. 5 is a schematic enlarged view of a part IV of the display panel 10 of FIG. 1 according to an embodiment. In detail, the first corner display area CDA1 of the display panel 10 is enlarged and viewed from a side surface. In such an embodiment, since the first corner display area CDA1 may be substantially the same as the second to fourth corner display areas CDA2, CDA3, and CDA4, the first corner display area CDA1 will hereinafter be described in detail, and any repetitive detailed description of the second to fourth corner display areas CDA2, CDA3, and CDA4 will be omitted.

Referring to FIG. 5, an embodiment of the display panel 10 may include a plurality of strip portions STP and a plurality of penetration portions V, which are arranged to correspond to the first corner display area CDA1.

The strip portions STP may extend from a corner MDAc of the main display area MDA. In such an embodiment, the strip portions STP may extend from the corner MDAc of the main display area MDA to the corner portion cp of the display panel 10. In such an embodiment, the strip portions STP may extend from the main display area MDA toward the first corner display area CDA1.

Although FIG. 5 illustrates an embodiment where the length l of each of the strip portions STP is the same as each other, the invention is not limited thereto. In an alternative embodiment, the lengths l of the strip portions STP may be different from each other. The length l of each of the strip portions STP may vary based on a distance that the strip portions STP is apart from the center portion of the first corner display area CDA1. In an embodiment, for example, among the plurality of strip portions STP, the length of each of the strip portions STP located at the center portion may be greater than the length of other strip portions STP. As a separation distance between the center portion of the first corner display area CDA1 to each of the strip portions STP increases, the length l of each of the strip portions STP may decrease.

The strip portions STP may be arranged apart from each other with a certain gap gp therebetween. The gap gp between the strip portions STP may vary. In an embodiment, for example, the gap gp between the strip portions STP may increase as being away from the main display area MDA toward the first corner display area CDA1. The gap gp between the strip portions STP may gradually increase as the gap gp is farther away from the corner MDAc of the main display area MDA. The strip portions STP may be arranged radially.

Although FIG. 5 illustrates an embodiment where the strip portions STP are radially arranged, the invention is not limited thereto. In an alternative embodiment, the gap gp between the strip portions STP may be constant without varying. In such an embodiment, the strip portions STP may be arranged parallel to each other.

The penetration portions V may be defined by the strip portions STP. As described above, the strip portions STP may be arranged apart from each other with the gap gp therebetween, and empty spaces between the strip portions STP may be referred to as the penetration portions V, respectively. The penetration portions V may be located between the strip portions STP.

As each of the penetration portions V corresponds to an empty space between the strip portions STP, a width wd of each of the penetration portions V may correspond to the gap gp between the strip portions STP. The width wd of each of the penetration portions V may vary. In an embodiment, for example, the width wd of each of the penetration portions V may gradually increase as being away from the main display area MDA toward the first corner display area CDA1. The width wd of each of the penetration portions V may gradually increase as the width wd is farther away from the corner MDAc of the main display area MDA.

Although FIG. 5 illustrates an embodiment where the width wd of each of the penetration portions V is variable, the invention is not limited thereto. In an alternative embodiment, the width wd of each of the penetration portions V may be constant without varying.

The penetration portions V may each penetrate a front surface (or upper surface) and a lower surface (or rear surface) of the display panel 10. The penetration portions V may reduce the weight of the display panel 10, and improve flexibility of the display panel 10. Furthermore, when an external force, for example, a force to bend, fold, pull, and the like, is applied to the display panel 10, the shape of the penetration portions V is changed, and thus generation of stress may be easily reduced during deformation of the display panel 10, and abnormal deformation of the display panel 10 may be prevented and durability of the display panel 10 may be improved. Accordingly, when an electronic device including the display panel 10 is used, user convenience may be improved, and the display panel 10 may be easily applied to wearable devices.

When an external force is applied to the display panel 10, the width wd, area, or shape of each of the penetration portions V may be changed, and the positions of the strip portions STP may be changed as well. In an embodiment, for example, when a force to bend edges of the display panel 10 and the corner therebetween acts, the gap gp between the strip portions STP may be reduced, and the width wd or area of each of the penetration portions V may be reduced.

In such an embodiment, as described above, when an external force is applied to the display panel 10, the gap gp between the strip portions STP and the width wd, area, or the like of each of the penetration portions V may be changed, and thus the shape of the strip portions STP may be not changed. The pixels PX of FIG. 1 including pixel circuits and display elements, various wirings, and the like may be arranged on the strip portions STP. As the shape of the strip portions STP is not changed even when an external force is applied to the display panel 10, the pixels PX, various wirings, and the like arranged on the strip portions STP may be protected. The pixels PX may be arranged in the first corner display area CDA1 having a curvature, and the display area DA of FIG. 1 may extend from the main display area MDA to the first corner display area CDA1.

Figure 6:
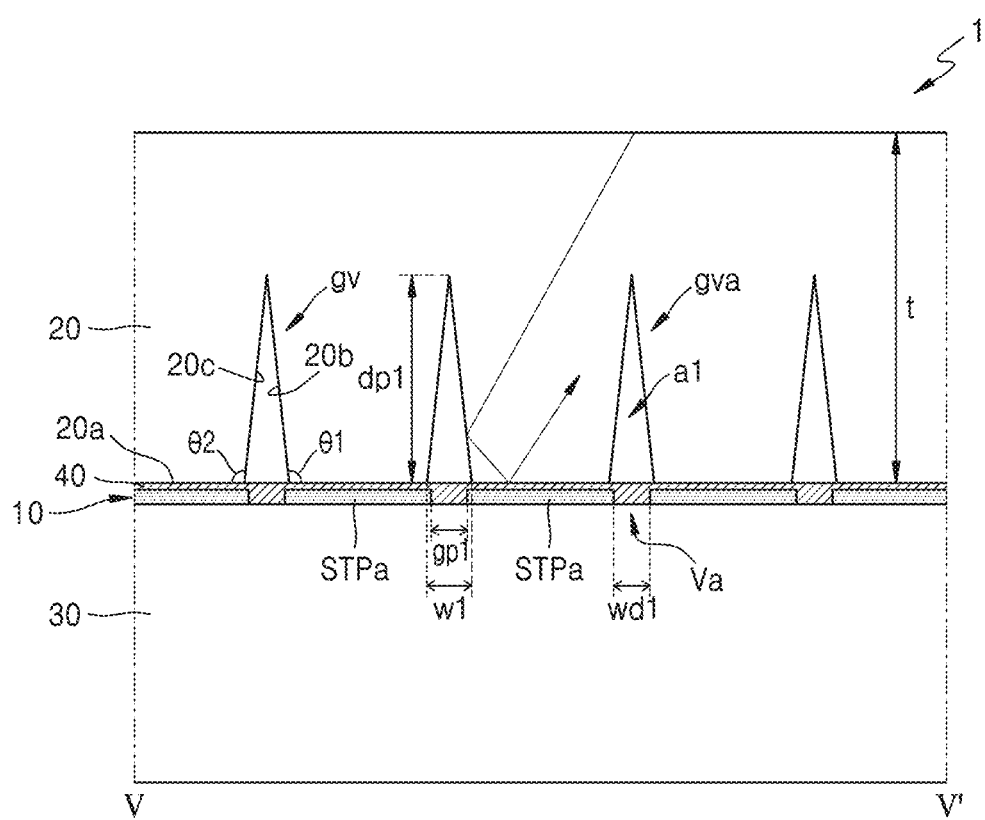
FIG. 6 is a cross-sectional view of the strip portions of FIG. 5 taken along line V-V'.
Figure 7:
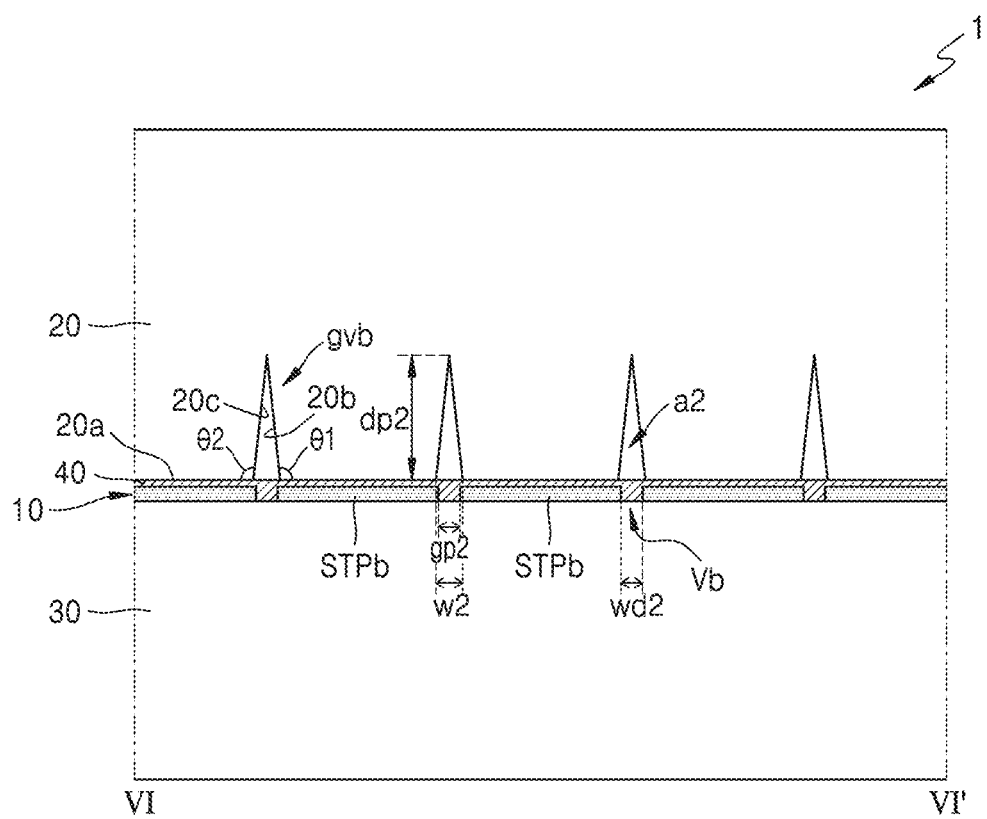
FIG. 7 is a cross-sectional view of the strip portions of FIG. 5 taken along line VI-VI'.

FIG. 6 is a cross-sectional view of the strip portions STP of FIG. 5 taken along line V-V', and FIG. 7 is a cross-sectional view of the strip portions STP of FIG. 5 taken along line VI-VI'. In detail, FIG. 6 illustrates first parts STPa of the strip portions STP apart by a first distance d1 from the corner MDAc of the main display area MDA. FIG. 7 illustrates second parts STPb of the strip portions STP apart by a second distance d2 from the corner MDAc of the main display area MDA. The first distance d1 may be greater than the second distance d2. FIGS. 6 and 7 illustrate the cover window 20 and a panel protection member 30, and the like, in addition to the strip portions STP. In FIGS. 6 and 7, like reference numerals denote like elements.

Referring to FIG. 6, an embodiment of the display apparatus 1 may include the display panel 10, the cover window 20, the panel protection member 30, and an adhesive layer 40.

In such an embodiment, the display panel 10 may include the strip portions STP as described above with reference to FIG. 5. The strip portions STP may be arranged apart from each other in the corner display area CDA of FIG. 1, and may extend from the corner MDAc of the main display area MDA. The penetration portions V may be defined between the strip portions STP.

The gap gp of FIG. 5 between the strip portions STP may vary. In an embodiment, for example, a first gap gp1 between the first parts STPa of the strip portions STP of FIG. 6 may be greater than a second gap gp2 between the second parts STPb of the strip portions STP of FIG. 7. The gap gp between the strip portions STP may gradually increase as the gap gp is farther away from the corner MDAc of the main display area MDA.

The width wd of FIG. 5 of each of the penetration portions V may vary. In an embodiment, for example, a first width wd1 of each of first parts Va of the penetration portions V of FIG. 6 may be greater than a second width wd2 of each of the second parts Vb of the penetration portions V of FIG. 7. The width wd of each of the penetration portions V may gradually increase as the width wd is farther away from the corner MDAc of the main display area MDA.

Although FIGS. 6 and 7 illustrate an embodiment where the gap gp between the strip portions STP and the width wd of each of the penetration portions V are variable, the invention is not limited thereto. In an alternative embodiment, the gap gp between the strip portions STP and the width wd of each of the penetration portions V may be constant without varying. In an embodiment, for example, the first gap gp1 between the first parts STPa of the strip portions STP of FIG. 6 may be substantially the same as the second gap gp2 between the second parts STPb of the strip portions STP of FIG. 7. The first width wd1 of each of the first parts Va of the penetration portions V of FIG. 6 may be substantially the same as the second width wd2 of each of the second parts Vb of the penetration portions V of FIG. 7.

The cover window 20 may be arranged on the display panel 10. The cover window 20 may include glass, sapphire, or plastic. In an embodiment, for example, the cover window 20 may include ultra-thin glass)(UTG® or transparent polyimide (e.g., CPI). In an embodiment, the cover window 20 may have a structure in which a polymer layer having flexibility is arranged on one surface of a glass substrate, or only the polymer layer is arranged.

In an embodiment, the cover window 20 may have a plurality of grooves gv that are concave in a thickness direction t. The grooves gv may be located in the corner display area CDA. The grooves gv may respectively correspond to the penetration portions V defined between the strip portions STP. The grooves gv may be arranged apart from each other and may extend from the corner MDAc of the main display area MDA.

The cover window 20 may have a first surface 20a facing the display panel 10, a plurality of first inner side surfaces 20b, and a plurality of second inner side surfaces 20c, the plurality of first inner side surfaces 20b and the plurality of second inner side surfaces 20c being connected to the first surface 20a. One end of each of the second inner side surfaces 20c may be connected to the first surface 20a, and the other end of each of the second inner side surfaces 20c may be connected to the first inner side surfaces 20b. Each of the grooves gv may be defined by each of the first inner side surfaces 20b and each of the second inner side surfaces 20c, which are connected to each other.

In an embodiment, a first angle $\theta 1$ between each of the first inner side surfaces 20b and the first surface 20a and a second angle $\theta 2$ between each of the second inner side surfaces 20c and the first surface 20a may be greater than about 90° and less than or equal to about 120°. In such an embodiment, an angle between the first surface 20a and a side surface or side wall of each of the grooves gv may be greater than about 90° and less than or equal to about 120°. In such an embodiment where the first angle $\theta 1$ is greater than about 90° and less than or equal to about 120°, as illustrated in FIG. 6, each of the first inner side surfaces 20b may totally reflect light incident on the cover window 20. In such an embodiment, the features of each of the first inner side surfaces 20b described herein may be applied to each of the second inner side surfaces 20c. In such an embodiment, each of the second inner side surfaces 20c may totally reflect the light incident on the cover window 20.

In a comparative example, where the grooves gv are not formed in the cover window 20, the light incident on the cover window 20 may reach not only the strip portions STP, but also the penetration portions V. In this state, reflectivity in the strip portions STP may be different from reflectivity in the penetration portions V. The reflectivity in the penetration portions V may be less than the reflectivity in the strip portions STP. Accordingly, due to a difference between the reflectivity in the strip portions STP and the reflectivity in the penetration portions V, the boundary between the strip portions STP may be clearly visually recognized.

In an embodiment of the invention, as described above, the grooves gv are formed in the cover window 20, such that the light incident on the cover window 20 may be totally reflected by the grooves gv. In such an embodiment, as the external light that is totally reflect reaches the strip portions STP only, not the penetration portions V, a phenomenon of visually recognizing the boundary between the strip portions STP may be diminished.

In an embodiment, the first angle 81 between each of the first inner side surfaces 20*b* and the first surface 20*a* may be constant. The second angle 82 between each of the second inner side surfaces 20*c* and the first surface 20*a* may be constant. In an embodiment, for example, the first angle 81 of FIG. 6 may be the same as the first angle 81 of FIG. 7, and the second angle 82 of FIG. 6 and the second angle 82 of FIG. 7 may be the same as each other.

In an embodiment, the first angle 81 between each of the first inner side surfaces 20*b* and the first surface 20*a* may be the same as the second angle 82 between each of the second inner side surfaces 20*c* and the first surface 20*a*.

Although FIGS. 6 and 7 illustrate embodiments where the first angle 81 and the second angle 82 are the same as each other, the invention is not limited thereto. In an alternative embodiment, the first angle 81 and the second angle 82 may be different from each other.

In an embodiment, as illustrated in FIG. 6, the cross-sectional shape of a closed surface formed by the first surface 20*a*, each of the first inner side surfaces 20*b*, and each of the second inner side surfaces 20*c* may be triangular. In an embodiment where the cross-sectional shape of each of the grooves gv is triangular, the incident angle of external light incident in the thickness direction t may not be 90°, and thus the external light may be reflected without being refracted into each of the grooves gv.

In an embodiment, the depth of each of the grooves gv may vary. The depth of each of the grooves gv may mean a vertical distance from the first surface 20*a* to the other end of each of the second inner side surfaces 20*c*. In an embodiment, for example, a first depth dp1 of each of first parts gva of the grooves gv of FIG. 6 may be greater than a second depth dp2 of each of second parts gvb of the grooves gv of FIG. 7. The depth of each of the grooves gv may gradually increase as the depth is farther away from the corner MDAc of the main display area MDA.

The width of each of the grooves gv may vary. The width of each of the grooves gv may mean a horizontal distance on the first surface 20*a*. In an embodiment, for example, a first width w1 of each of the first parts gva of the grooves gv of FIG. 6 may be greater than a second width w2 of each of the second parts gvb of the grooves gv of FIG. 7. The width of each of the grooves gv may gradually increase as the width is farther away from the corner MDAc of the main display area MDA.

In an embodiment, a ratio of the depth to the width of each of the grooves gv may be constant. In an embodiment, for example, the ratio of the first depth dp1 and the first width w1 of FIG. 6 may be the same as the ratio of the second depth dp2 and the second width w2 of FIG. 7.

The ratio of the depth to the width of each of the grooves gv may be about 2:1 or more. In an embodiment, for example, the ratio of the depth to the width of each of the grooves gv may be in a range of about 2:1 to about 10:1, or in a range of about 2 to about 10.

Although FIGS. 6 and 7 illustrate embodiments where the depth and width of each of the grooves gv are variable, but the invention is not limited thereto. In an alternative embodiment, the depth and width of each of the grooves gv may be constant without varying. In an embodiment, for example, the first depth dp1 of each of the first parts gva of the grooves gv of FIG. 6 may be substantially the same as the second depth dp2 each of the second parts gvb of the grooves gv of FIG. 7. The first width w1 of each of the first parts gva of the grooves gv of FIG. 6 may be substantially the same as the second width w2 of each of the second parts gvb of the grooves gv of FIG. 7.

In an embodiment, the cross-sectional area of each of the grooves gv may vary. In an embodiment, for example, a first cross-sectional area a1 of each of the first parts gva of the grooves gv of FIG. 6 may be greater than a second cross-sectional area a2 of each of the second parts gvb of the grooves gv of FIG. 7. The cross-sectional area of each of the grooves gv may gradually increases as the cross-sectional area is farther away from the corner MDAc of the main display area MDA.

Although FIGS. 6 and 7 illustrate embodiments where the cross-sectional area of each of the grooves gv is variable, the invention is not limited thereto. In an alternative embodiment, the cross-sectional area of each of the grooves gv may be constant without varying. In an embodiment, for example, the first cross-sectional area a1 of each of the first parts gva of the grooves gv of FIG. 6 may be substantially the same as the second cross-sectional area a2 of each of the second parts gvb of the grooves gv of FIG. 7.

The panel protection member 30 may be arranged below the display panel 10. The panel protection member 30 may function to protect the lower surface of the display panel 10. The panel protection member 30 may include a material having elasticity and flexibility. In an embodiment, for example, the panel protection member 30 may include polydimethylsiloxane ("PDMS"), poly urethane, and the like.

The adhesive layer 40 may be provided between the display panel 10 and the cover window 20. The adhesive layer 40 may include OCR, OCA, or PSA. Although not illustrated in FIGS. 6 and 7, an adhesive layer may be provided between the display panel 10 and the panel protection member 30.

Figure 8:
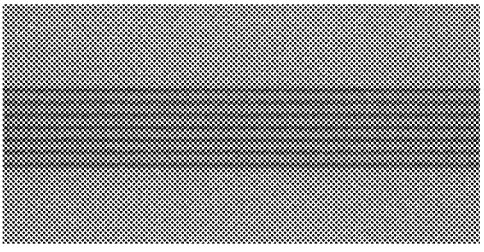
FIG. 8 illustrates a comparison of whether a boundary between strip portions of a display panel is visually recognizable.

FIG. 8 illustrates a comparison of whether a boundary between the strip portions STP of a display panel is visually recognizable.

Referring to FIG. 8, it may be shown whether the boundary between the strip portions STP (see FIG. 5) is visually recognized in a case where the grooves gv of FIG. 6 are not formed in the cover window 20 of FIG. 6 (Ref.) and in a case where the grooves gv are formed in the cover window 20.

As shown in FIG. 8, when the grooves gv are not formed in the cover window 20 (Ref.), the external light may reach not only the strip portions STP, but also the penetration portions V of FIG. 5 corresponding to the boundary between the strip portions STP. As the reflectivity in the strip portions STP and the reflectivity in the penetration portions V are different from each other, the difference between the reflectivity in the strip portions STP and the reflectivity in the penetration portions V may be generated. Accordingly, the boundary between the strip portions STP may be clearly visually recognized.

In an embodiment of the invention, where the grooves gv are formed in the cover window 20, the light incident on the cover window 20 may be totally reflected by the grooves gv. As the totally reflected external light does not reach the penetration portions V corresponding to the boundary between the strip portions STP and reaches only the strip portions STP, the phenomenon of visually recognizing the boundary between the strip portions STP may be diminished as shown in FIG. 8.

Figure 9:
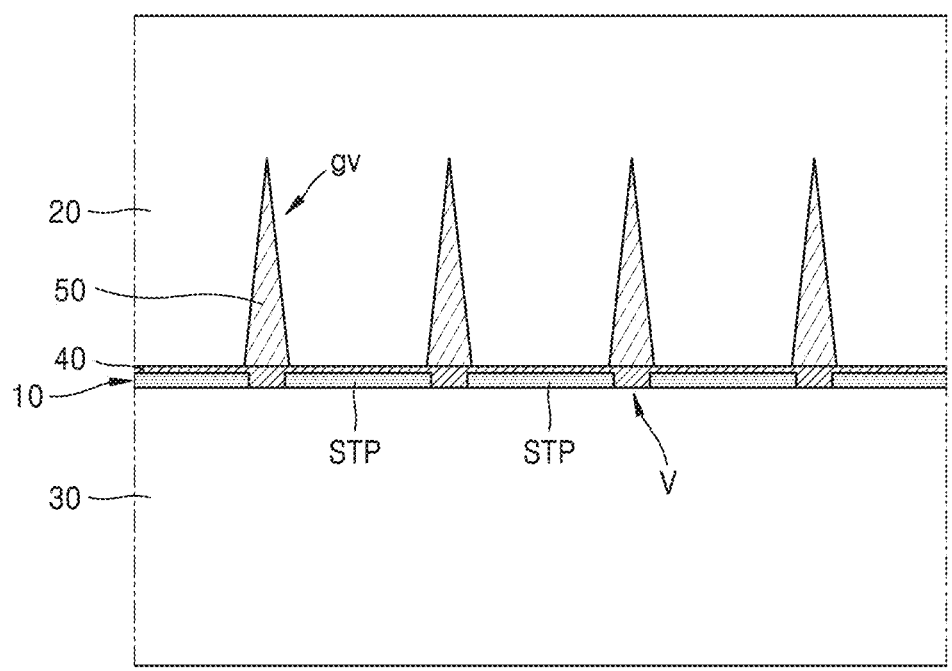
FIG. 9 is a schematic cross-sectional view of a display apparatus according to an alternative embodiment.

FIG. 9 is a schematic cross-sectional view of a display apparatus according to an alternative embodiment. The embodiment of the display apparatus of FIG. 9 is substantially the same as the embodiment of FIG. 6 except for the structure of a cover window. The same or like elements shown in FIG. 9 have been labeled with the same reference characters as used above to describe the embodiment of the display apparatus shown in FIG. 6, and any repetitive detailed description thereof will hereinafter be omitted or simplified.

Referring to FIG. 9, in an alternative embodiment, an optical functional layer 50 may be arranged in each of the grooves gv. The refractive index of the cover window 20 and the refractive index of the optical functional layer 50 may be different from each other. In an embodiment, for example, the refractive index of the cover window 20 may be greater than the refractive index of the optical functional layer 50. In such an embodiment where the refractive index of the cover window 20 is greater than the refractive index of the optical functional layer 50, the light incident on the cover window 20 may be totally reflected by the grooves gv.

Although FIG. 9 illustrates an embodiment where the optical functional layer 50 is arranged only in the grooves gv, the invention is not limited thereto. In an alternative embodiment, at least part of the optical functional layer 50 may be provided between the cover window 20 and the adhesive layer 40. In such an embodiment, at least part of the optical functional layer 50 may be arranged in each of the grooves gv.

Furthermore, although FIG. 9 illustrates an embodiment where the optical functional layer 50 is arranged in each of the grooves gv, the invention is not limited thereto. In an alternative embodiment, the optical functional layer 50 may not be arranged in each of the grooves gv of FIGS. 6 and 7. In such an embodiment, air and the like may exist in each of the grooves gv.

Figure 10:
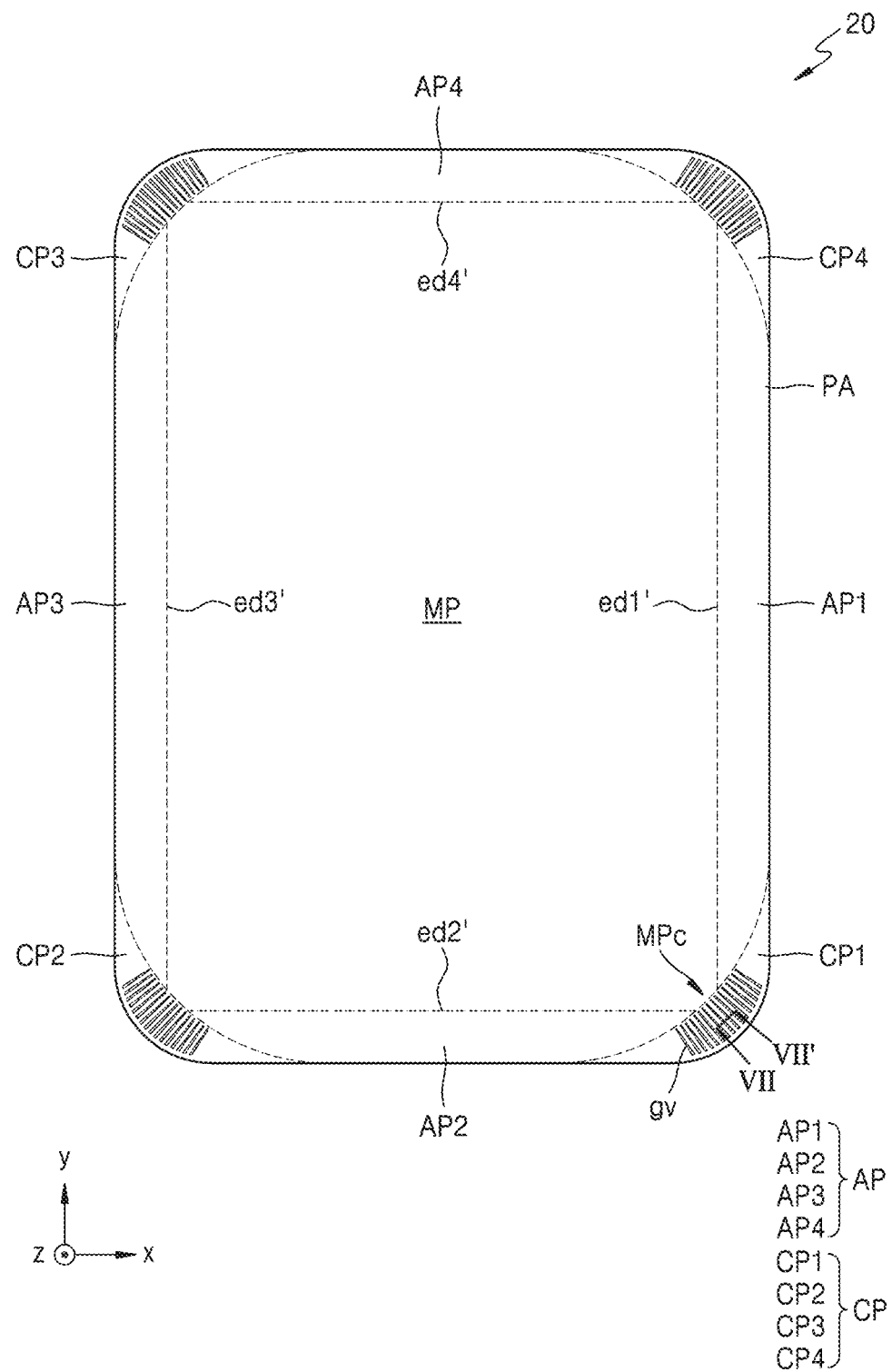
FIG. 10 is a schematic plan view of a cover window according to an embodiment.
Figure 11:
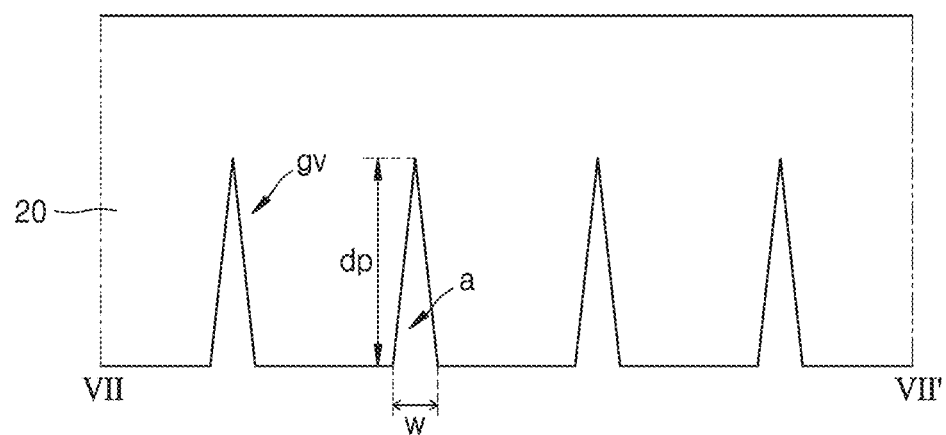
FIG. 11 is a cross-sectional view of the cover window of FIG. 10 taken along line VII-VII'.

FIG. 10 is a schematic plan view of the cover window 20 according to an embodiment, and FIG. 11 is a cross-sectional view of the cover window 20 of FIG. 10 taken along line VII-VII'.

First, referring to FIG. 10, an embodiment of the cover window 20 may include a main portion MP, an auxiliary portion AP, and a corner portion CP. The main portion MP may correspond to the main display area MDA of FIG. 1, the auxiliary portion AP may correspond to the auxiliary display area ADA of FIG. 1, and the corner portion CP may correspond to the corner display area CDA of FIG. 1.

The auxiliary portion AP may be connected to an edge of the main portion MP. In an embodiment, for example, a first auxiliary portion AP1 may be connected to a first edge ed1' of the main portion MP, and a second auxiliary portion AP2 may be connected to a second edge ed2' of the main portion MP. In such an embodiment, a third auxiliary portion AP3 may be connected to a third edge ed3' of the main portion MP, and a fourth auxiliary portion AP4 may be connected to a fourth edge ed4' of the main portion MP.

The auxiliary portion AP may be bent at a certain radius of curvature. In an embodiment, for example, the first auxiliary portion AP1 and the third auxiliary portion AP3 may have the first radius of curvature r1 of FIG. 2. In such an embodiment, the second auxiliary portion AP2 and the fourth auxiliary portion AP4 may have the second radius of curvature r2 of FIG. 3. In an alternative embodiment, the radius of curvature of the first auxiliary portion AP1 and the radius of curvature of the third auxiliary portion AP3 may be different from each other. In such an embodiment, the radius of curvature of the second auxiliary portion AP2 and the radius of curvature of the fourth auxiliary portion AP4 may be different from each other.

The corner portion CP may extend from a corner MPc of the main portion MP to be bent. The corner portion CP may be arranged between the auxiliary portions AP that neighbor each other. In an embodiment, for example, a first corner portion CP1 may be arranged between the first auxiliary portion AP1 and the second auxiliary portion AP2. In such an embodiment, a second corner portion CP2 may be arranged between the second auxiliary portion AP2 and the third auxiliary portion AP3. In such an embodiment, a third corner portion CP3 may be arranged between the third auxiliary portion AP3 and the fourth auxiliary portion AP4. In such an embodiment, a fourth corner portion CP4 may be arranged between the fourth auxiliary portion AP4 and the first auxiliary portion AP1.

The corner portion CP may connect the auxiliary portions AP that neighbor each other. In an embodiment, for example, the first corner portion CP1 may connect the first auxiliary portion AP1 to the second auxiliary portion AP2. In such an embodiment, the second corner portion CP2 may connect the second auxiliary portion AP2 to the third auxiliary portion AP3. In such an embodiment, the third corner portion CP3 may connect the third auxiliary portion AP3 to the fourth auxiliary portion AP4. In such an embodiment, the fourth corner portion CP4 may connect the fourth auxiliary portion AP4 to the first auxiliary portion AP1. In such an embodiment, as described above, the auxiliary portion AP and the corner portion CP may be arranged to surround the main portion MP, and may each be bent at a certain radius of curvature.

In an embodiment, the corner portion CP may have a plurality of the grooves gv. The grooves gv may be concave in a thickness direction of the cover window 20, as illustrated in FIG. 11. Air and the like may exist in each of the grooves gv, or the optical functional layer 50 described above in FIG. 9 may be arranged in each of the grooves gv.

In such an embodiment, the grooves gv may be substantially the same as those described above with reference to FIGS. 5 to 7. In an embodiment, for example, the cross-sectional shape of each of the grooves gv may be triangular, and the interior angle of each vertex may be about 60° or more and less than about 90°. In an embodiment, a depth dp of each of the grooves gv may gradually increase as the depth dp is farther away from the corner MPc of the main portion MP. The width w of each of the grooves gv may gradually increase as the width w is farther away from the corner MPc of the main portion MP. The ratio of the depth dp to the width w of each of the grooves gv may be in a range of about 2:1 to about 10:1. In an embodiment, the cross-sectional area a of each of the grooves gv may gradually increase as the cross-sectional area a is farther away from the corner MPc of the main portion MP.

In an embodiment, where the cover window 20 includes the grooves gv, the light incident on the cover window 20 may be totally reflected by the grooves gv. In such an embodiment, materials having different reflectivity are arranged below the cover window 20, such that a phenomenon of visually recognizing a boundary between the materials may be diminished by the grooves gv formed in the cover window 20.

According to various embodiments, the grooves are formed in the cover window, such that a phenomenon of visually recognizing a boundary between materials arranged below the cover window and having different reflectivity may be diminished.

The invention should not be construed as being limited to the embodiments set forth herein. Rather, these embodiments are provided so that this disclosure will be thorough and complete and will fully convey the concept of the invention to those skilled in the art. For example, it may be understood that a cover window manufacturing method for manufacturing such a cover window and a display apparatus manufacturing method for manufacturing such a display apparatus also fall within the scope of one or more embodiments.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:
a display panel comprising a main display area, a first auxiliary display area connected to a first edge of the main display area, a second auxiliary display area connected to a second edge of the main display area, and a corner display area connecting the first auxiliary display area to the second auxiliary display area, wherein an extending direction of the second edge crosses an extending direction of the first edge; and
a cover window disposed on the display panel, wherein a plurality of grooves, which is concave in a thickness direction of the cover window, is defined in the cover window to correspond to the corner display area.

2. The display apparatus of claim 1, wherein
the display panel comprises a plurality of strip portions apart from each other in the corner display area and extending from a corner of the main display area, and
the plurality of grooves respectively correspond to a plurality of penetration portions defined between the plurality of strip portions.

3. The display apparatus of claim 2, wherein
each of the plurality of grooves comprises a first part having a first depth and a second part having a second depth which is less than the first depth,
the first part is apart by a first distance from the corner of the main display area, and
the second part is apart by a second distance from the corner of the main display area, wherein the second distance is less than the first distance.

4. The display apparatus of claim 3, wherein
the first part of each of the plurality of grooves has a first width, and
the second part of each of the plurality of grooves has a second width which is less than the first width.

5. The display apparatus of claim 4, wherein a ratio of the first depth to the first width is equal to a ratio of the second depth to the second width.

6. The display apparatus of claim 2, wherein
each of the plurality of grooves comprises a first part apart by a first distance from the corner of the main display area, and a second part apart by a second distance from the corner of the main display area, wherein the second distance is less than the first distance, and
a first cross-sectional area of the first part is greater than a second cross-sectional area of the second part.

7. The display apparatus of claim 1, wherein
the plurality of grooves extend from a corner of the main display area, and
a width of each of the plurality of grooves gradually increases as the width is farther away from the corner of the main display area.

8. The display apparatus of claim 1, wherein
the plurality of grooves extend from a corner of the main display area, and
a depth of each of the plurality of grooves gradually increases as the depth is farther away from the corner of the main display area.

9. The display apparatus of claim 1, wherein a ratio of a depth to a width of each of the plurality of grooves is in a range of about 2 to about 10.

10. The display apparatus of claim 1, wherein
the cover window includes a first surface facing the display panel, a plurality of first inner side surfaces, and a plurality of second inner side surfaces, wherein the plurality of first inner side surfaces and the plurality of second inner side surfaces are connected to the first surface,
one end of each of the plurality of second inner side surfaces is connected to the first surface,
another end of each of the plurality of second inner side surfaces is connected to the plurality of first inner side surfaces, and
each of the plurality of grooves is defined by the plurality of first inner side surfaces and the plurality of second inner side surfaces.

11. The display apparatus of claim 10, wherein a first angle between each of the plurality of first inner side surfaces and the first surface is equal to a second angle between each of the plurality of second inner side surfaces and the first surface.

12. The display apparatus of claim 10, wherein a first angle between each of the plurality of first inner side surfaces and the first surface and a second angle between each of the plurality of second inner side surfaces and the first surface are each greater than about 90° and less than or equal to about 120°.

13. The display apparatus of claim 10, wherein the plurality of first inner side surfaces and the plurality of second inner side surfaces totally reflect light incident on the cover window.

14. The display apparatus of claim 1, further comprising:
an optical functional layer, at least part of which is disposed in the plurality of grooves.

15. The display apparatus of claim 14, wherein a refractive index of the cover window is greater than a refractive index of the optical functional layer.

16. A cover window comprising:
a main portion;
a first auxiliary portion connected to a first edge of the main portion and having a first radius of curvature;
a second auxiliary portion connected to a second edge of the main portion and having a second radius of curvature, wherein an extending direction of the second edge crosses an extending direction of the first edge; and
a corner portion connecting the first auxiliary portion to the second auxiliary portion, wherein a plurality of grooves, which is concave in a thickness direction of the corner portion, is defined in the corner portion.

17. The cover window of claim 16, wherein
the plurality of grooves extend from a corner of the main portion, and
a width of each of the plurality of grooves gradually increases as the width is farther away from the corner of the main portion.

18. The cover window of claim 16, wherein
the plurality of grooves extend from a corner of the main portion, and
a depth of each of the plurality of grooves gradually increases as the depth is farther away from the corner of the main portion.

19. The cover window of claim 16, wherein a ratio of a depth and a width of each of the plurality of grooves is in a range of about 2 to about 10.

20. The cover window of claim 16, wherein
the plurality of grooves extend from a corner of the main portion, and
a cross-sectional area of each of the plurality of grooves gradually increases as the cross-sectional area is farther away from the corner of the main portion.

\* \* \* \* \*